United States Patent

[11] 3,546,380

[72] Inventor Oskar Sturzinger
Baar Zurich, Switzerland
[21] Appl. No. 757,337
[22] Filed Sept. 4, 1968
Continuation-in-part of Ser. No. 426,890, Jan. 21, 1965, abandoned.
[45] Patented Dec. 8, 1970
[73] Assignee Anstalt Europaische Handelsgesellschaft Vaduz, Principality of Liechtenstein
[32] Priority Jan. 21, 1964
[33] Switzerland
[31] No. 669/64
Continuation-in-part of application Ser. No. 426,890, Jan. 21, 1965, now abandoned. This application Sept. 4, 1968, Ser. No. 757,337

[54] CIPHERING AND DECIPHERING APPARATUS
4 Claims, 8 Drawing Figs.

[52] U.S. Cl. 178/22, 178/26
[51] Int. Cl. H04l 9/00
[50] Field of Search 178/22, 26, 26.5; 340/164; 317/134

[56] References Cited
UNITED STATES PATENTS

| | | | |
|---|---|---|---|
| 2,406,023 | 8/1946 | Locke | 178/22 |
| 2,406,829 | 9/1946 | Haglund et al. | 178/22 |
| 2,874,215 | 2/1959 | Zenner | 178/22 |
| 2,984,700 | 5/1961 | Small | 178/22 |

*Primary Examiner*—Thomas A. Robinson
*Attorney*—Wenderoth, Lind & Ponack

ABSTRACT: In a signal-mixing apparatus for ciphering and deciphering in which signals other than alphabet letters (in particular CCITT Combination No. 4 which is used to trigger the answer-back device of a receiving station) may occur as a result of the ciphering of signals, certain signals (including the said Combination No. 4) should be prevented from being transmitted as such. To that end, the apparatus comprises, in connection with a keying device, a detector for such signal connected to the outlet of the keying device, bypassing conductors and switching means whereby any signal which on ciphering would produce the combination signal to be avoided, is bypassed around the keying device and delivered to the outgoing line in unciphered form. Arrangements are also provided at the receiving station for testing the incoming signals as to whether they are normal ciphered signals or signals which for the said reason had been transmitted in unciphered form. These latter are passed on without deciphering, while the others are deciphered in the usual way.

INVENTOR
OSKAR STURZINGER

BY Wenderoth, Lind & Ponack
ATTORNEYS

CIPHERING AND DECIPHERING APPARATUS

The present invention is a continuation-in-part of my application for U.S. Pat. filed Jan. 21, 1965, Ser. No. 426,890, now abandoned.

In the art of ciphering, equipment is known which can be connected into teleprinting lines as so-called mixing apparatus for ciphering and deciphering. As a rule, such apparatus when operating uses a continuously changing key which like the pulse information transmitted over the line is available in the form of a five-digit binary code.

Ciphering is effected on one text signal element after the other by mixing it (by sign multiplication or "exclusively or" combination) with a key signal element in such a manner that for deciphering merely another ciphering operation is required.

Such mixing equipment logically can work directly in the line, or it can be used for cooperating with teleprinters in a purely local manner without line connection, in which case the ciphered text always must be punched since it can contain all the 32 combinations of the telegraph code (such as the CCITT Alphabet No. 2), and only 26 of these combinations can be represented by printable symbols.

In most instances, the key as well is introduced by means of a perforated tape, unless the mixing apparatus itself is equipped with autonomous key-producing devices. In the first alternative, the mixer will comprise a tape scanner for the key tape, but it can also be equipped with a second tape scanner for the text tape, this tape scanner being usable as part of a tape-scanning transmitter both for clear and cipher operation. Such mixing apparatuses are mainly used in diplomatic service. They offer a high degree of secrecy (by using random-punched tapes or other prepunched tapes, so-called "-camouflage tapes", for the key), and they are of simple construction.

The known apparatus of this kind has the following drawbacks:

1. Mixing according to the sign multiplication system necessarily produces, for instance in the CCITT Code No. 2, all 32 possible combinations. Thus, mixing of Signal No. 18 R with No. 24 Y gives Combination No. 32. According to the International Convention, this combination is not transmitted and it is only admitted by special agreement between the telegraph companies concerned.
2. Combination No. 4 when used on the ciphered side may start the so-called answer-back unit or automatic call sign transmitter of the receiving station if messages ciphered in this manner are received by a punching receiver without previous deciphering.
3. With page-printing receivers, Combinations Nos. 27 (carriage return) and 28 (line feed) can spoil the printing of a ciphered text when receiving undeciphered messages e.g. with supervising equipment of the telegraph company), whereby supervision as to proper transmission is rendered impossible.

The invention does away with the drawbacks of these known apparatuses. It relates to a wiring system for mixing apparatus comprising an electrical or electromechanical computerlike keying device for ciphering and deciphering messages which consist of signals distributed on individual internal signal conductors.

The invention is characterized thereby that switching means are provided in said internal signal conductors for selectively transmitting or not transmitting definite signals through the keying device, or causing them to bypass the keying device, said keying device having at least as many inlets and outlets as there are signs in the alphabet to be used in transmitting.

Control of the keying device can be effected by means of punched tapes or by means of rotating elements.

Reintroduction of signals from the outlets to the inlets and to the bypass conductors of the keying device can be effected by switches.

Keying can be effected, for example, by means of shifting permutators.

For automatic switching of the signal reintroducing conductors and of the bypass conductors, control orders may be supplied by detectors.

In the drawings, embodiments of the invention, given by way of example only, are represented diagrammatically.

The apparatus represented is based on the following two principles:

1. Instead of a mixing operation in the binary code of the telegraph system, a mixing operation is effected in the 26-sign or in the 32-sign system of the selected alphabet code. In the mixer shown in FIG. 1 the 32 possible combinations coming in at the inlet *a* are supplied to a quintuple line *c* by a receiving distributor *b* and distributed among 32 clear-side signal conductors *e* numbered 1 to 32, respectively, by a 5-to-32 code-transforming repeater *d*. The signal conductors *e* lead to a keying device *f* having 32 clear-side or inlet terminals and 32 secret-side or outlet terminals. From these latter, 32 secret-side signal conductors *g* again numbered 1 to 32, respectively, proceed to a 32-to-5 code-transforming repeater *h*, from which another quintuple line *i* goes to a sending distributor *k* which delivers the ciphered message to an outgoing line *m*, again in the form of the conventional five-digit binary code.

While the parts thus far described are substantially conventional, the present invention provides a three-position switching device *q* mounted between the code-transforming repeater *d* and the keying device *f*, and a two-position switching device *r* similarly mounted between the keying device *f* and the code-transforming repeater *h*. These switching devices *q* and *r* are connected to each other by bypassing conductors *s*; their construction and operation will be described later on with reference to FIGS. 3 to 8.

The keying device *f* may consist of an electronic or electromechanical, counterlike combination comprising, for instance, a set of combination switch wheels or a set of wheels provided with contact-controlling cams. In the present example, however, ciphering is effected by means of a camouflage tape. This permits using control arrangements capable of acting as so-called shifting permutators for effecting keying operations by permutation in a manner similar to the operation of combination switch wheels. An example will be described later on with reference to FIG. 2.

Figure 1:
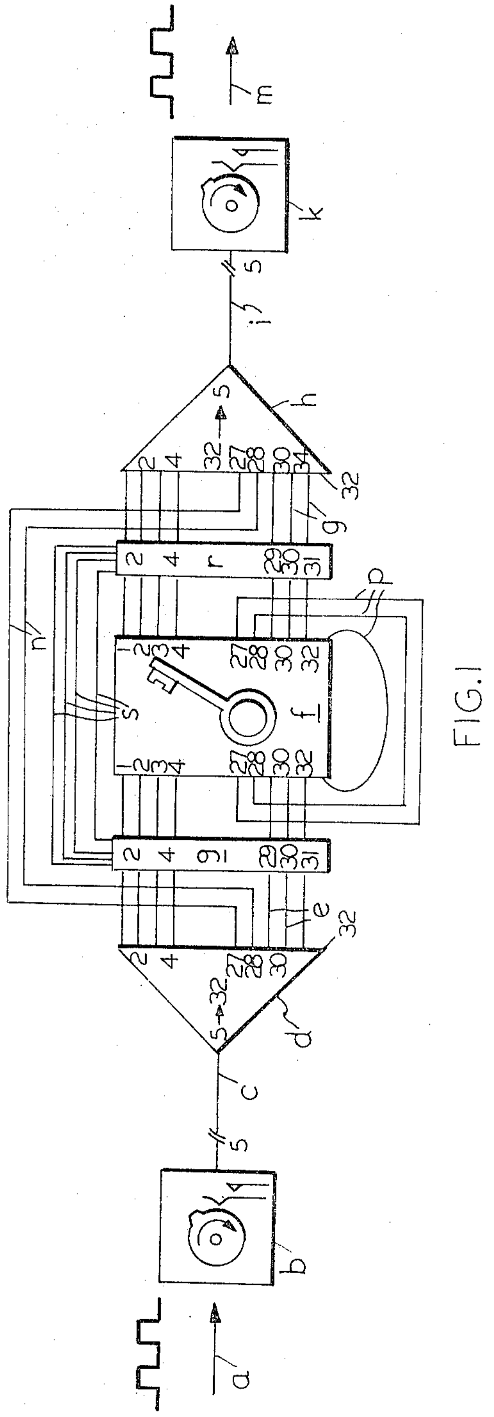
FIG. 1 is a diagram representing a mixing apparatus according to the invention.

2. All the outlet terminals of the keying device *f* which correspond to signs which are not desired at the transmission end are connected back to the inlet terminals of the keying device. For example, as shown in FIG. 1, the outlet terminal no. 32 is connected back to the inlet terminal no. 32 by a bypassing conductor *p*. Thereby, Signal No. 32 is prevented from occurring in the ciphered text.

The clear-side signal conductor no. 32 coming from the code-transforming repeater *d* is not connected to any inlet terminal of the keying device *f*. This is irrelevant since this sign does not appear on the teleprinter keyboard, and the teleprinter alphabet in fact only comprises 31 signals.

If it is desired to have Signals No. 27 and 28 transmitted in their unciphered form to the outgoing line in order to enable page printers to operate properly if they have to put down the ciphered text, conductors no. 27 and no. 28 are connected directly by bypassing conductors *n* from the code-transforming repeater *d* to the repeater *h* while bypassing the keying device *f*, and the outlet terminals no. 27 and no. 28 of the latter are connected back to the respective inlet terminals by further bypassing conductors *p*.

It would be possible to suppress Signal No. 4 in a similar way as indicated in the above first example. Signal conductor *g* no. 4 (letter D) coming from the keying device 6 would then preferably be connected to terminal no. 20 (letter T) of code-transforming repeater *h*. In most cases, this would not create any ambiguity. However, the invention provides a different solution which will be indicated later on.

Keying units can also be constructed which have less than 32 inlet or outlet terminals. For example, a 26-pole arrangement can be chosen for a 26-sign alphabet. Of course, units having more inlet and outlet terminals than there are signs in the alphabet used are also feasible; in that case, a number of the inlet terminals will be short-circuited by pairs with their corresponding outlet terminals.

Depending on the service required, the said signal reintroducing connections may be controllable or permanent. It is also possible to provide mutual interchangeability of the conductors provided for reintroducing certain outgoing signals into the keying unit, since thereby an additional safety factor can be introduced into the ciphering arrangement. For instance, outlet terminal no. 27 can be connected back to inlet terminal no. 32, outlet terminal no. 28 to inlet terminal no. 27, and outlet terminal no. 32 to inlet terminal no. 28.

The improved solution which the invention provides for the problem of preventing the transmission, to the outgoing line, of the CCITT Combination No. 4 (letter D) which triggers the answer-back unit or automatic call sign indicator of the receiving station, will now be described with reference to FIGS. 3 to 8.

In order to avoid crowding of these FIGS., only one clear-side or inlet signal conductor *e*, one bypassing conductor *s* (the function of which is different from that of the bypassing conductors *n* and *p* of FIG. 1), and one secret-side or outlet signal conductor *g* is shown of the up to 32 conductors of each kind which the apparatus actually comprises. It will be noted, however, that there are no signal conductors *e* and *g* for those signals which are not to be transmitted to or from the keying device *f*, such as Combinations Nos. 27,28 and 32 in the present example.

The three-position switching device *q* connected to the clear-side signal conductors *e* between the code-transforming repeater *d* and the keying device *f* has one row of fixed contacts 52 each connected to one of the clear-side signal conductors *e*, one row of fixed contacts 53 each connected to one of the clear-side or inlet terminals 54 on the keying device *f*, and a third row of fixed contacts 55 each connected to one of the aforesaid bypassing conductors.

The movable part of the switching device *q* comprises a contact segment 56 for each set of fixed contacts 52, 53 and 55. These contact segments 56 are pointly movable, e.g. by rotation of a common shaft on which they are supported, to connect in each set either contacts 52 and 53, or 53 and 55, or 55 and 52 depending on the position of the movable part.

Accordingly, the three-position switching device *q* is capable of connecting, in a first position, each of the clear-side signal conductors *e* to the corresponding terminal 54 of the keying device *f;* in a second position each of these terminals 54 to the corresponding bypassing conductor *s;* and in a third position, each of the bypassing conductors *s* to the corresponding signal conductor *e*.

On the secret-side of the keying device *f*, the two-position switch *r* comprises one row of fixed contacts 58 each of which is connected by one of the bypassing conductors *s* to a corresponding contact 55 of the three-position switch 51, and a second row of fixed contacts 59 each of which is connected to one of the secret-side or outlet terminals 60 of the keying device *f*.

The movable part of the switching device *r* incorporates a row of contact members 61 each of which is permanently connected to one of the secret-side signal conductors *g* and which, depending on its position, electrically connects that conductor either to one or to the other of a pair of the fixed contacts 58 and 59.

Accordingly, each of the secret-side signal conductors *g* is selectively connectable either to the respective secret-side terminal 60 of the keying device, or to the respective bypassing conductor *s* unit at the receiving station but it can also be connected to other such terminals which correspond to signals which it is desired to prevent from reaching the outgoing line *m*.

The detector *t* is responsive to the occurrence of this Signal No. 4 and of said other signals if any for actuating each of the said two switching devices, causing the three-position switching device *q* to connect the clear-side signal conductors *e* each to its corresponding bypassing conductor *s*, and the two-position switching device *r* to connect the secret-side signal conductors *g* also each to its corresponding bypassing conductor *s* and thereby to the corresponding clear-side signal conductor *e*.

Figure 2:
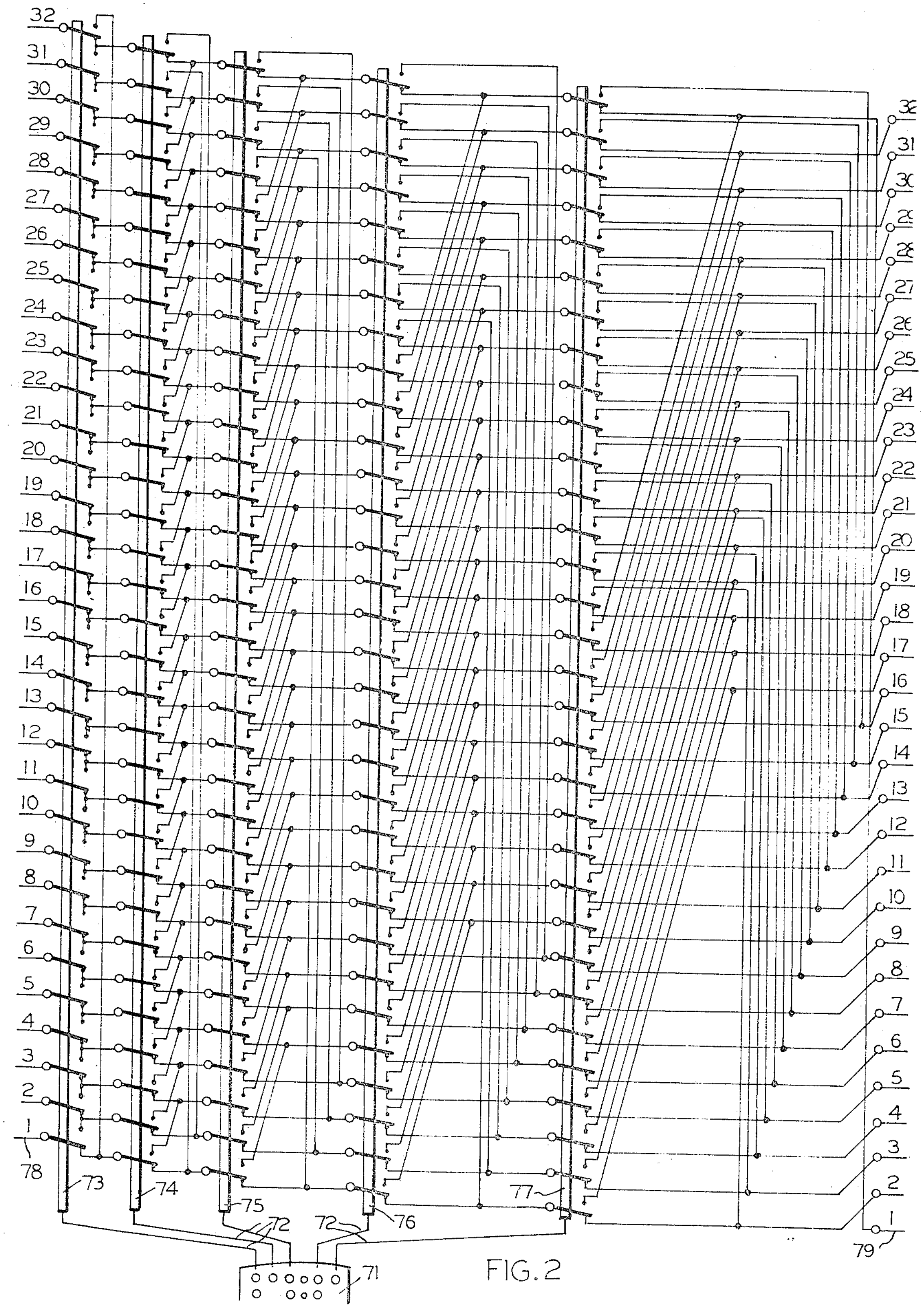
FIG. 2 represents a shifting layout for the keying device.

An embodiment of the keying device *f* formed by a tape-controlled shifting permutator constructed for 32 inlets and outlets is represented in FIG. 2 and will now be described.

Reference numeral 71 indicates the perforated key tape and 72 are five scanning levers which are coupled with multipole, two-position switches 73 to 77. These switches may be formed as spring assemblies or as pushrod switches or as rotatable contact disks 78 indicates the 32 inlet terminals and 79 the 32 outlet terminals.

The wiring is such that in their rest position (no hole in the tape) the switches of the permutator produce a direct connection between each inlet terminal 78 and the outlet terminal 79 having the same order number plus one. In their working position (when sensing a hole) they cause the connections to be shifted so that finally any and all permutations (excluding connection of each inlet terminal to the outlet terminal having the same order number) can be effected.

For example, it is possible to cause the switch 73 to shift all 32 connections upwards by one more step, i.e., to connect inlet terminal no. 1 to outlet terminal no. 3, inlet terminal no. 2 to outlet terminal no. 4, etc.

The switch 74 produces a shifting or displacement by two steps on having detected a hole in the second row on the tape. Switch 75 produces a four-step displacement, switch 76 an eight-step displacement and switch 77 a 15-step displacement. It can be seen that when there are 32 hole combinations, 31 different shiftings are possible. For example, Combination No. 2 representing the letter B (holes in the first, fourth and fifth row) produces an 18-step shift (15 + 2 + 1) in addition to the basic offset by one step, that is, inlet terminal no. 1 is switched over to outlet terminal no. 20, inlet terminal no. 2 is switched over to outlet terminal no. 21 and inlet terminal no. 13 is switched over to outlet terminal no. 32, inlet terminal no. 14 being connected to outlet terminal no. 1 again (14 + 19 − 32), and so on. From this, it also results that by merely reducing the number of incoming signal conductors it would not be possible to avoid the drawbacks mentioned since in every case one of all the 32 outgoing conductors has a chance of becoming connected. Only the proposed reintroduction of signals warrants the reduction of the outlets to the desired number.

It is evident that with the proposed basic offset by one step of the outlet terminals with reference to the inlet terminals to which they are connected, and by provision of a 15-step rather than a 16-step displacement in the last row of switches 77, the variable shift cannot exceed 30 steps and the total number of steps is neither 0 nor 32. The fact that another number of steps (16) is reached with two different combinations (1 + 2 + 4 + 8 + 1 and 15 + 1) is irrelevant in cryptological respect. Thus, the tape appearing in FIG. 2, if placed so as to have its second hole combination scanned, would produce a total shift of 1 + 4 + 8 (=13) + 1 = 14 steps.

Figure 3:
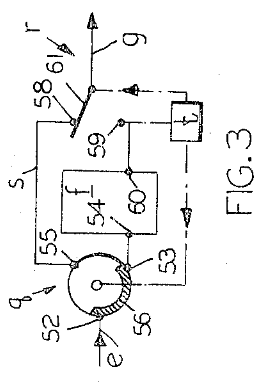

The detector *t* operates as follows to prevent the transmission of Signal No. 4:

In their normal position for transmitting a text in ciphered form from the incoming conductor *a* through the outgoing conductor *m*, the switching devices *q* and *r* are brought into their readiness position for transmitting, which is shown in FIG. 3. In this position, the segments 56 of the three-position switching device *q* connect the signal conductors *e* to the inlet terminals 54, thus cutting off the bypassing conductors *s*, and the members 61 of the two-position switching means *r* connect these cutoff bypassing conductors *s* to the outlet conductors *g*.

Thus, the outlet terminals 60 of the keying device *f* are cut off except for the connection of terminal no. 4 (and of any other terminals the signal from which should not be transmitted to the outgoing line *m*) to the detector *t*.

Depending on what signal is fed into the keying device *f*, i.e. depending on which signal conductor *e* becomes busy, and depending on what key signal happens to be effective in the keying device, a ciphered signal is delivered at one or the other outlet terminal 60 of the keying device.

Figures 4, 5, 6, 7, 8:
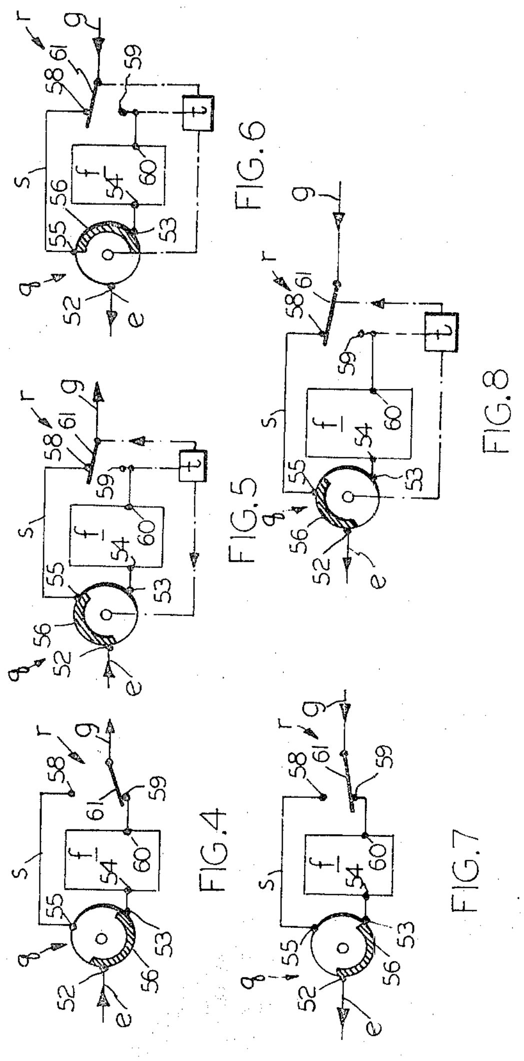
FIGS. 3 to 8 are diagrams representing the connections for one set of signal conductors and its associated switching means, for various operating conditions.

If it is delivered at outlet terminal no. 4 or at a terminal at which no signal ought to be delivered and therefore also connected to the detector *t*, then the detector *t* becomes operative to bring the three-position switch *q* into the position shown in FIG. 5, in which the segments 56 connect the clear-side or inlet signal conductors *e* to the bypassing conductors *s*; at the same time, the two-position switch *r* is maintained by the detector *t* in its position (FIGS. 3 and 5) in which it connects the bypassing conductors *s* to the secret-side or outlet conductors *g* and thereby to the outgoing line.

Therefore, the signal transmitted to the line is never the ciphered signal delivered to terminal no. 4 (or any other signal which should not go onto the line), but the clear signal received through the respective inlet conductor *g*.At the receiving station, this unciphered signal will be received and processed as such in the manner which will be described later with reference to FIGS. 6 to 8.

It must be noted that since as mentioned above the keying device *f* never produces a total shift by 0 or 32 steps, no signal fed into the keying device is ever delivered by the latter in unciphered form. Therefore, even if the unciphered signal supplied through the inlet signal conductors *e* is Signal No. 4, this signal will occur on the outlet side neither as result of ciphering nor as a result of bypassing.

If, on the contrary, the ciphered signal is delivered at an outlet terminal other than no. 4 (or than any terminal at which no signal ought to be delivered towards the outgoing conductor), then the detector *t* connected to such terminal no. 4 does not become operative. The three-position switching device *q* then remains in its position shown in FIG. 3, its segments 56 connecting the clear-side or inlet conductors *e* to the inlet terminals 54, while the member 61 of the two-position switching device *r* are no longer retained in their readiness position as shown in FIG. 3 but return to their normal position in which one of them is shown in FIG. 4.

Accordingly, as shown in FIG. 4, the inlet signal conductors *e* are connected to the outlet signal conductors *g* through the keying device *f* and the signals are transmitted in ciphered form to the outgoing line.

In deciphering operations, the receiving and sending distributors 2 and 10 and the code-transforming repeaters 4 and 8 swap their functions. The information then passes from the right to the left.

For this purpose, the switching devices *q* and *r* are brought into their receiving readiness positions represented in FIG. 4, that is, the segments 56 of the three-position switching device *q* now connect the inlet terminals 54 of the keying device to the corresponding bypassing conductors *s*, while the members 61 of the two-position switch *r* connect the secret-side signal conductors *g* (to which the designation "outlet conductors" would no longer apply) to these bypassing conductors *s*, as shown in FIG. 6.

The signals received through the secret-side signal conductors *g* are thus fed into the keying device *f* from the left and tentatively ciphered once again in that device. If among the outlet terminals 60, that for Signal No. 4 (or for another signal transmission of which is excluded) becomes busy, this is evidence that the signal received is an unciphered signal which on ciphering would have become Signal No. 4 so that it could not be transmitted in ciphered form. Therefore, it is necessary as well to pass it on in undeciphered in the receiving station.

Since the outlet terminal for Signal No. 4 (and the terminal for any other signal to be withheld from transmission) is connected to the detector *t*, this again becomes operative whenever that terminal becomes busy, the switching devices *q* and *r* are brought into the same positions as those in which they are shown in FIG. 5 (see FIG. 8). The signal coming in from the right through one of the signal conductors *g* is then switched over the bypassing conductors *s* past the keying device *f* and directly to the signal conductors *e* at the left side.

If, on the contrary, the tentatively ciphered signal appears at another outlet terminal 60 than that for Signal No. 4 (or for the said other signal not admitted for transmission), then the detector *t* will not become operative and switching devices *q* and *r* will be brought into the same positions as those in which they were shown in FIG. 4. As shown in FIG. 7, the signal coming in from the right through one of the signal conductors *g*, is then directed to the corresponding secret-side or (in this case wrongly termed) "outlet" terminal 60 of the keying device *f*. Passing through the latter, it deciphered and the deciphered signal is directed by the corresponding segment 56 from the "inlet" or clear-side terminal 54 which becomes busy, to the respective clear-side signal conductor *e*.

Since in addition to preventing Signal No. 32 from being transmitted, Signal No. 4 thus is also prevented from going out, and means are provided for sending and receiving an admissible substitute therefore, a mixing apparatus provided with this arrangement can be used without restriction in International Telex communications, regardless of whether the receiver effects immediate deciphering or whether it only punches tapes.

The proposed solutions are not limited to a definite wiring adapted for operation with codified pulse signals. Purely local arrangements with keys and a printing mechanism can be devised, whereby a local ciphering apparatus would result, this apparatus having no bodily or functional connection whatever with a telecommunications system.

I claim:

1. Mixing apparatus for ciphering and deciphering information laid down in a sequence of signals of a code comprising a limited number of different signals including information-carrying signals and function signals, said apparatus comprising a keying device having a plurality of clear-side terminals each for one of the signals which said code comprises and a plurality of secret-side terminals each for one of said different signals, said keying device including means for receiving predetermined key signals in sequence and for connecting each of said clear-side terminals with one of said secret-side terminals the identity of which depends both on the identity of said clear-side terminal and on the last received key signal, a set of clear-side signal conductors each connectable to one of said clear-side terminals, a set of secret-side signal conductors each connectable to one of said secret-side terminals, a set of bypassing conductors each connectable on one hand selectively to one of said clear-side signal conductors or to the clear-side terminal to which this clear-side signal conductor is connectable, and on the other hand to one of said secret-side signal conductors, first switching means adapted for selectively interconnecting in a first condition each of said clear-side signal conductors and the clear-side terminal to which it is connectable, in a second condition each of said clear-side terminals and the bypassing conductor to which it is connectable, and in a third condition each of said bypassing conductors and the clear-side signal conductor to which it is connectable, second switching means adapted for selectively connecting each of the secret-side signal conductors selectively in a first condition to the secret-side terminal to which it is connectable and in a second condition to the bypassing conductor to which said secret-side conductor is connectable.

2. Mixing apparatus as claimed in claim 1 comprising detector means connected to all of said secret-side signal conductors and to at least one of said secret-side terminals and responsive to the occurrence of an incoming signal at any one of said secret-side conductors to bring said first switching means into their said third condition and said second switching means into their said second condition, and further responsive to the nonoccurrence of any of the signals at said at least one secret-side terminal to maintain said first and second switching means in their said first conditions, respectively, and to the occurrence of such a signal at said at least one secret terminal to bring said first and second switching means into their said second position, respectively, for the duration of said signal.

3. Mixing apparatus as claimed in claim 1 in which the number of said clear-side terminals exceeds the number of said clear-side signal conductors and the number of said secret-side terminals exceeds the number of said secret-side signal conductors.

4. Mixing apparatus as claimed in claim 1 in which at least one of the secret-side terminals of said keying device is directly connected to one of said clear-side terminals of said keying device.